(12) United States Patent
Reddy et al.

(10) Patent No.: US 6,986,120 B2
(45) Date of Patent: Jan. 10, 2006

(54) SYSTEM AND APPARATUS FOR PROGRAMMING SYSTEM VIEWS IN AN OBJECT ORIENTED ENVIRONMENT

(75) Inventors: Sreedhar Sannareddy Reddy, Pune (IN); Sajeev Thomas, Pune (IN)

(73) Assignee: TATA Consultancy Services Limited, Mumbai (IN)

( * ) Notice: Subject to any disclaimer, the term of this patent is extended or adjusted under 35 U.S.C. 154(b) by 670 days.

(21) Appl. No.: 10/052,071

(22) Filed: Jan. 16, 2002

(65) Prior Publication Data

US 2003/0098880 A1    May 29, 2003

(30) Foreign Application Priority Data

Jul. 26, 2001    (IN) .................. 721/MUM/2001

(51) Int. Cl.
*G06F 9/44*    (2006.01)
(52) U.S. Cl. ............ 717/104; 717/108; 717/105; 717/109; 709/223
(58) Field of Classification Search .......... 717/105, 717/114, 108, 109, 104; 709/223
See application file for complete search history.

(56) References Cited

U.S. PATENT DOCUMENTS 5,838,973 A * 11/1998 Carpenter-Smith et al. . 717/105

6,684,386 B1 * 1/2004 Baisley ................. 717/114

FOREIGN PATENT DOCUMENTS

IN    721/MUM/2001    7/2001

OTHER PUBLICATIONS

"Metamodeling in OO" OOPSLA '95 Workshop summary, by Hafedh Mili, Francois Pachet, Itham Benyahia, Fred Eddy. OOPSLA'95, Oct. 15-19, 1995, pp. 105-110.*

* cited by examiner

*Primary Examiner*—Tuan Dam
*Assistant Examiner*—Chih-Ching Chow
(74) *Attorney, Agent, or Firm*—Donald R. Boys; Central Coast Patent Agency, Inc.

(57) ABSTRACT

A software control interface for creating and editing system views of a business information system using object models shaped to define the system views has a drawing tool for visually representing system views using model elements represented by icons, a first specification language for defining the various elements of a drawing, and a second specification language for defining mapping between drawing icons and objects stored in an object repository of the software system. The interface is characterized in that a user operating the drawing tool through a graphical user interface can, by dragging and dropping icons of the drawing tool onto a drawing sheet of the drawing tool, specify abstract models and model extensions expressed in diagrammatic notation transparent to the user and usable by the software system and associated repository.

14 Claims, 3 Drawing Sheets

Modeling Framework

SYSTEM AND APPARATUS FOR PROGRAMMING SYSTEM VIEWS IN AN OBJECT ORIENTED ENVIRONMENT

FIELD OF THE INVENTION

The present invention is in the field of software development in the area of object modeling, and pertains particularly to systems and apparatus for programming and editing information system views for display and analysis.

CROSS-REFERENCE TO RELATED DOCUMENTS

The present invention claims priority to Indian utility provisional patent application No. 721/MUM/2001 filed in India Jul. 26, 2001. The contents of the Indian provisional application are incorporated herein in its entirety by reference.

BACKGROUND OF THE INVENTION

In the area of software engineering, model repositories play a central role in the development and maintenance of large enterprise software systems. Model repositories store object models used to represent data and business functions. A complex software system has many facets, many levels of abstraction and many views, such as an analysis view, a design view, a GUI view, a database view, an architectural view, and so on.

One problem with prior-art modeling repositories is that they do not provide model views for all facets of software development and use. It is desired that a model repository provide modeling abstractions to capture all of the above-described views in a consistent manner. At the time of writing of this specification however, there is no standard modeling methodology or apparatus that provides all system views. To compensate for this weakness, companies provide model repositories that have some form of extensible meta-modeling framework that enables users to extend the modeling system with abstractions of their own. Using the extensibility features, users may program their own system views.

Although repositories with extension capabilities are available and facilitate user-created models, there is no built-in support for rendering the extended models in a visual, diagrammatic language. This has long been an area where generic repository systems have been weak. This is just one of the handicaps affecting wider acceptance of these repositories in the market place.

There are many commercial repository systems that provide extensibility around standard methodologies like Unified Modeling Language (UML). UML is a graphical language for visualizing, specifying, constructing, and documenting the artifacts of a software-intensive system. UML gives you a standard way to write a system's blueprints, covering conceptual things such as business processes and system functions, as well as concrete things such as classes written in a specific programming language, data base schemas, and reusable software components.

Another example of a commercial repository system is Entity Relationship (ER) modeling. Typically, repository systems are packaged with a visual modeling tool that supports these standard methodologies either directly or in the form of a bridge to third party modeling tools (e.g.: Rational Rose). However, they do not provide any built-in support that enables end-users to easily specify visual diagrammatic notation for modeling abstractions introduced by them. An end-user either has to be content with a generic, non-diagrammatic interface or build a graphical system from scratch if they want to provide visual modeling capability to abstractions introduced by them.

Therefore, what is clearly needed is a system, method, and apparatus that enables end-users to specify a concrete graphical notation for abstract models of various system views, without having to program them from scratch using code.

SUMMARY OF THE INVENTION

In a preferred embodiment of the present invention a software control interface for creating and editing system views of a business information system using object models shaped to define the system views is provided, comprising a drawing tool for visually representing system views using model elements represented by icons, a first specification language for defining the various elements of a drawing, and a second specification language for defining mapping between drawing icons and objects stored in an object repository of the software system. The interface is characterized in that a user operating the drawing tool through a graphical user interface can, by dragging and dropping icons of the drawing tool onto a drawing sheet of the drawing tool, specify abstract models and model extensions expressed in diagrammatic notation transparent to the user and usable by the software system and associated repository.

In one preferred embodiment the modeling system is defined according to a meta modeling framework that adheres to a hierarchical tri-level structure of abstraction. The modeling framework may include a system information model, a meta model and a meta meta model. In one embodiment the language for describing the system information model is UML. In an alternative embodiment the language for describing the system information model is XML.

In another aspect of the invention a method for creating and manipulating business system views of a complex software system through user manipulation of visual symbols and connectors stored in an object repository associated with the system, the symbols and connectors represented in an interface of a drawing tool is provided, comprising steps of (a) providing a first specification language specifying the symbols and connectors of the drawing tool; (b) providing a mapping second specification language for mapping drawing elements to repository objects; (c) selecting certain symbols and connectors from a palette of the drawing tool, and dropping them in certain order on an open sheet of the drawing tool until a view or view edit is complete; and (d) when complete, executing a completed system view for display on a graphical interface of the software system.

In a preferred embodiment of the method, in steps (a) through (d), a hierarchical tri-level meta modeling framework is observed. The meta modeling framework may include a system information model at a first level of abstraction, a meta model at a higher level of abstraction and a meta meta model at a highest level of abstraction.

In yet another embodiment of the invention an object modeling system for creating, editing, and displaying various views of a business information system is provided, comprising an object repository for storing object models and model elements, a drawing tool for visually representing system views using model elements represented by drawing icons associated with the tool, a first specification language for defining the various elements of a drawing represented by the drawing icons, and a second specification language for defining mapping between the drawing icons and model elements stored in the object repository. The system operates according to a tri-level meta modeling framework including a meta meta model functioning as a base model for the instantiation hierarchy of the framework, a meta model formed as an instance of the meta meta model, the meta model defining the structure and semantics for an information system view, and an information system model formed as an instance of the meta model, the information system model describing one or more specific information system views as specified by the meta model.

In a preferred embodiment UML, XML, and entity relationship modeling language is supported at the highest level of abstraction. Further, in a preferred embodiment, the icons comprise symbols and connectors. The association between the drawing icons and model elements stored in the repository may be automated. Further, in a preferred embodiment, dragging and dropping drawing icons from a drawing palette into a drawing sheet causes machine readable instruction for building system views in an object oriented way, the instruction code transparent to the user. The views may be customizable and extendable over existing system views by creating new icons and connectors using the drawing tool, specifying them in the drawing and mapping languages and storing the elements in the object repository.

DESCRIPTION OF THE PREFERRED EMBODIMENTS

Figure 1:
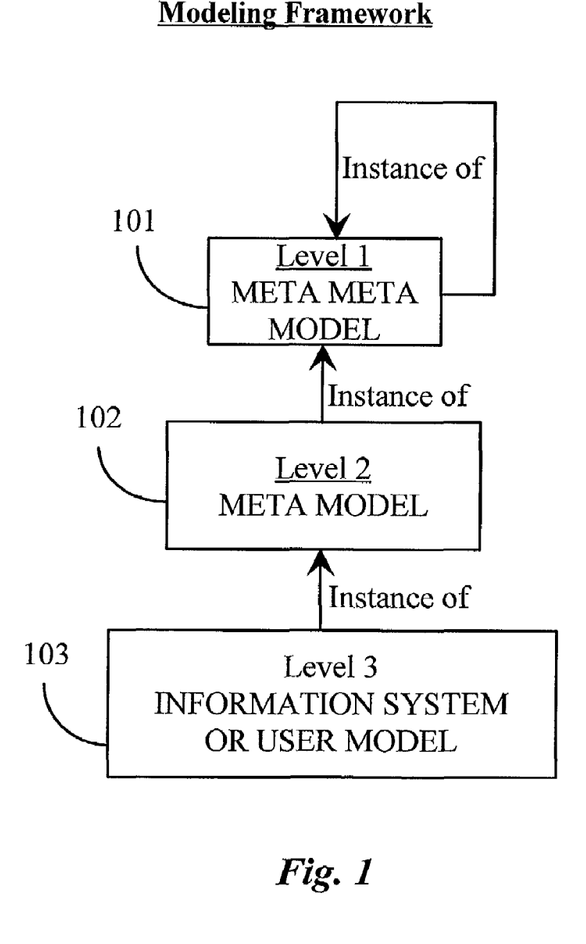
FIG. 1 is a block diagram illustrating a modeling framework according to an embodiment of the present invention

FIG. 1 is a block diagram illustrating a meta-modeling framework according to an embodiment of the present invention. A meta-modeling framework is provided that defines a hierarchical structure for enabling a programmable visual user interface for diagrammatical notation and editing of abstract models. The framework of this example enables end-users to easily specify visual diagrammatic notation for modeling abstractions of a particular view of a system component introduced by them. It is noted herein that the framework of this example is mappable to a subset of Object Management Group's (OMG) meta-modeling standard meta object facility (MOF). This means that any standard meta-modeling framework that conforms to MOF can use techniques modeled in terms of the tri-layer modeling framework of this example.

The modeling framework of this example comprises 3 levels of abstraction. These are a level 1 meta meta model represented herein by a block labeled with the element number 101, a level 2 meta model represented herein by a block labeled with the element number 102, and a level 3 user model or information system model represented herein by a block labeled 103.

Meta meta model 101 is illustrated as a base model having the highest level of abstraction, and is the basic building block for modeling meta models. Model 101 is capable of modeling itself as illustrated by a directional arrow labeled Instance Of emanating from and then leading back in to meta meta model 101. Meta meta model 101 is, in a preferred embodiment, the root component of instantiation hierarchy of the modeling framework. Instantiation hierarchy refers to hierarchical representation of abstractions with concrete instances. Meta meta model 101 has objects, associations and properties, which are described further below.

Meta model 102 is an instance of a meta meta model 101 as illustrated by a directional arrow labeled Instance Of emanating from model 102 and referring back to model 101. Meta model 102 has meta objects with associated meta properties, and meta associations defined between meta objects. Meta model 102 has a lower level of abstraction than model 101 and defines the structure and semantics for implementation of the information system model and can be in one embodiment, a UML meta model.

Model 103, referred to herein as an information system model or a user model is an instance of a meta model 102 as illustrated by a directional arrow labeled Instance Of emanating from model 103 and referring back to model 102. Model 103, at the lowest level of abstraction in the framework, captures specified description of the information system modeled from various points of view as is specified by meta model 102. For example, model 103 may be a UML model of an entire banking system. It is noted herein that the modeling framework of this example is abstract enough to support UML and other standard techniques like ER-modeling. A meta-modeling framework such as the one presented in this example provides a generic modeling language for describing any standard modeling method including UML.

Figure 2:
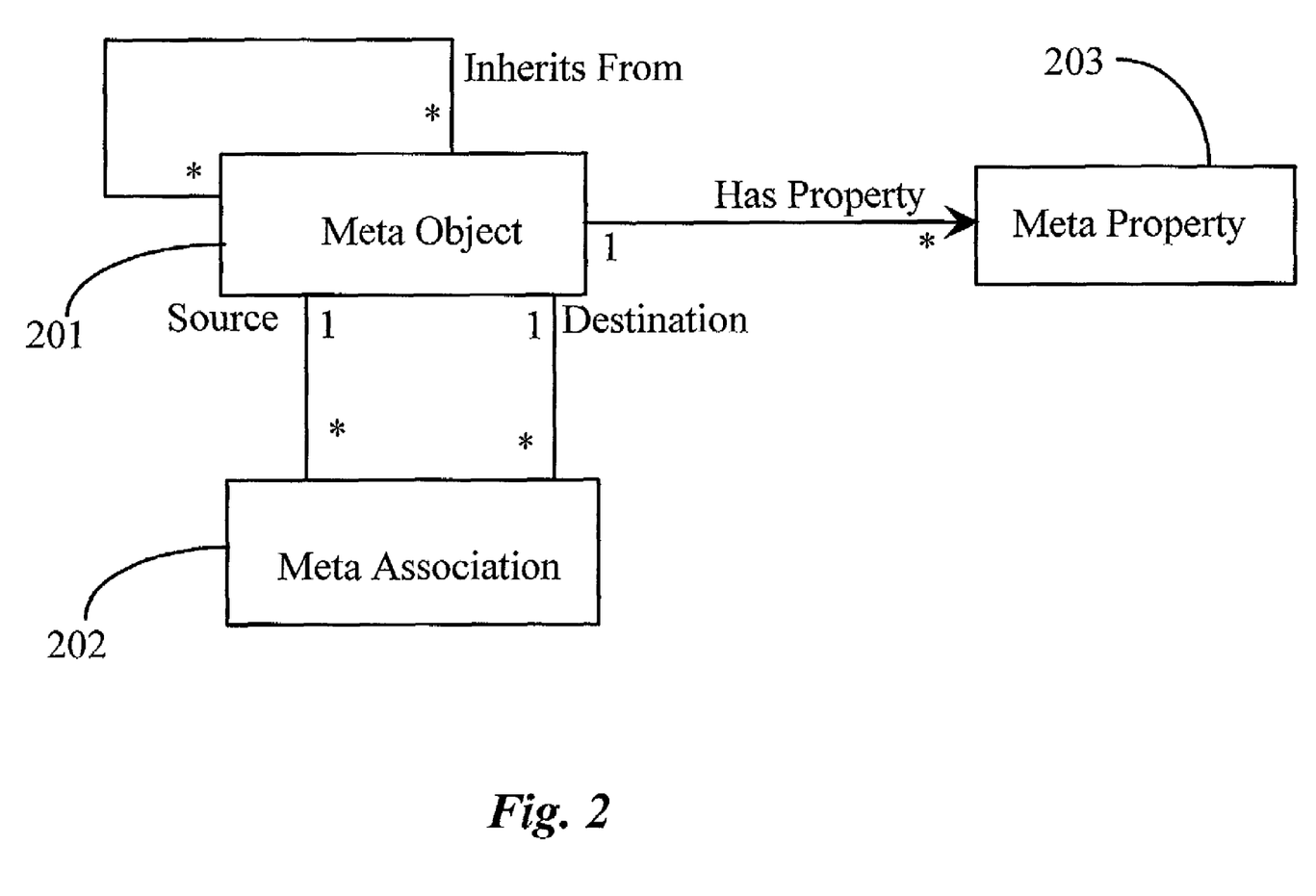
FIG. 2 is a block diagram illustrating structure of a meta model according to an embodiment of the present invention.

FIG. 2 is a block diagram illustrating structure of meta meta model 101 of FIG. 1 according to an embodiment of the present invention. Meta meta model 101 has a unique structure that supports one to one, one to many, or many to many associations. In the diagram, the notation 1 refers to one and the notation * refers to many. Default cardinality is shown in this example. In basic form meta meta model 101 has a meta object illustrated herein by a block labeled with the element number 201. Meta object 201 has a name, description, and a property (AbstractConcrete) that indicates whether the described object is an abstract object (cannot have instances) or a concrete object, which can have instances. Meta object 201 may inherit attributes from another meta object. This fact is illustrated by a connector loop labeled Inherits From with the default notation * to * meaning many to many.

Meta object 201 has a meta property object, illustrated herein by a block labeled Meta Property and given the element number 203. Meta property 203 is an object that describes a DataType (syntax). DataType includes the attributes Char (character), Number, and Binary. DataType also includes a data Size (syntax), which is equal to size of Char String and Number. A directional arrow labeled Has Property emanating from meta object 201 and progressing to meta property 203 illustrates object ownership of the meta property. Default cardinality for meta object 201 and meta property 203 is 1 to * or one to many.

Meta object 201 carries a meta association object illustrated herein as a block labeled Meta Association and given the element number 202. Meta association 202 has a forward and reverse name and a source and destination, which is optional meaning that the association is optional or mandatory for either a source object or a destination object. Meta association 202 also has a cardinality value for source and destination. The cardinality can be equal to one or more than one (many). In this example it is 1 to many (1, *). A further property of meta association 202 is the identification of the owner of the association, which can be the source object of the association or the destination object of the association.

Meta object 201 may inherit associations and properties from other meta objects as previously described above and illustrated by the connector line labeled Inherits From. This may occur on a one to many or on a many to many object basis as is shown in this example. Meta object 201 may have many meta properties 203 on a one to many basis as is shown.

It will be apparent to one with skill in the art of object modeling that this example is basic in form and is intended only to show the most basic hierarchical structure of the meta meta model. It will be appreciated that actual model structures would appear far more complex.

It will also be apparent to one with skill in the art that the meta model framework taught herein makes it very simple to extend standard modeling methods like UML with domain and/or application specific modeling abstractions. It is also possible to integrate different modeling methods by describing them as instances of a single unified meta-model.

Figure 3:
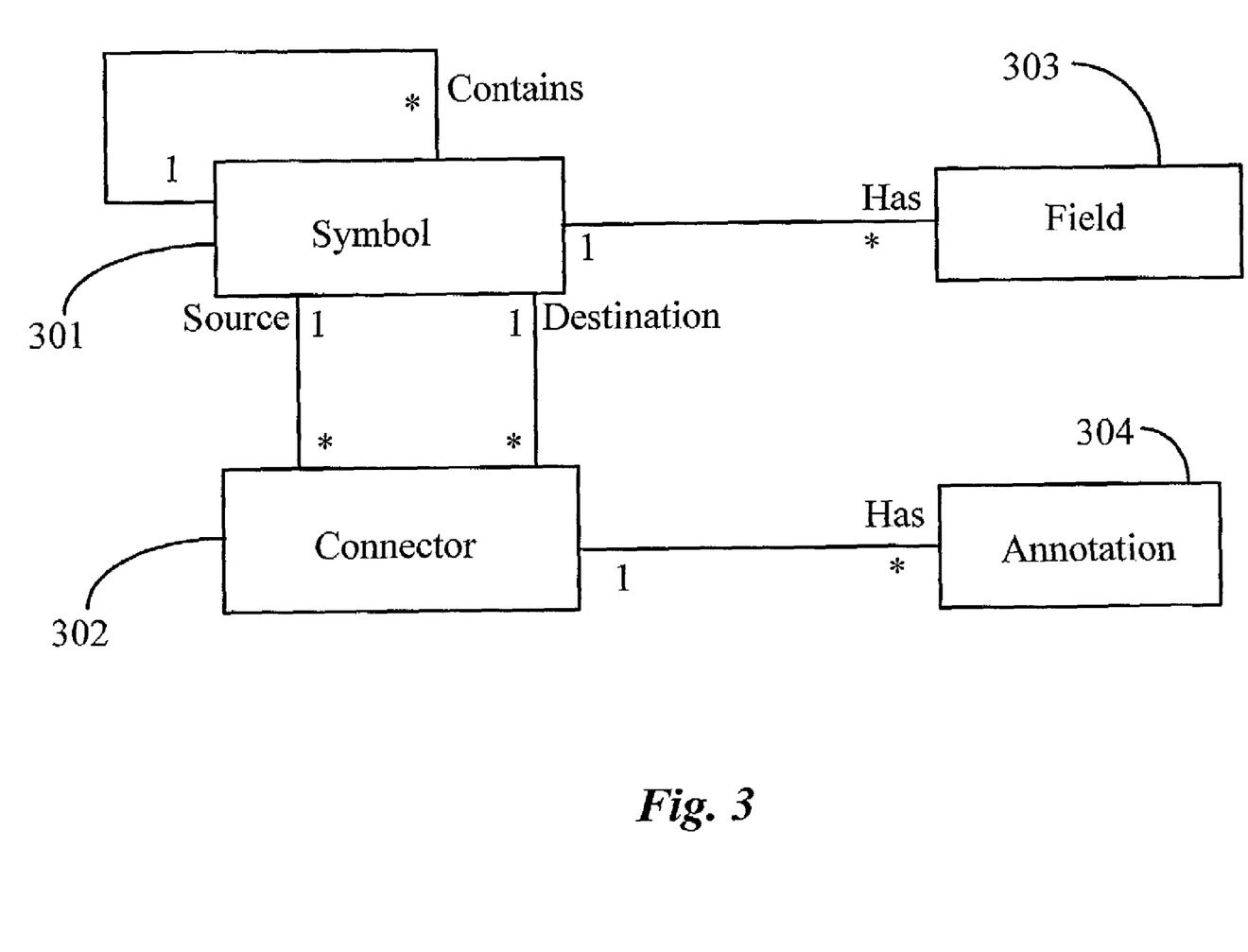
FIG. 3 is a block diagram illustrating structure of a diagram model according to an embodiment of the present invention.

FIG. 3 is a block diagram illustrating structure of a diagram model according to an embodiment of the present invention. Following the model framework structure illustrated in FIG. 2 above as a reference, a diagram model is illustrated as just one example of a visual rendition of the object structure of an object associated with a programmable diagrammatic interface of the present invention.

In this example, a meta object is represented as a symbol 301. A visual diagram can be conceptualized as a set of connected symbols. Symbol 301 has a text field 303. There is no limit to the number of fields 303 that symbol 301 can have. The association of symbol to field shows a 1 to * cardinality. Only one field is visually illustrated in this example and deemed sufficient for the purpose of explanation. Symbol 301 can inherit other properties and can contain other symbols Contains emanating from symbol 301 and referring back to symbol 301. The cardinality of the association is 1 to *. Symbol 301 can have connectors, as illustrated in this example by the association between Symbol 301 and a Connector 302. Connector 302 connects, at minimum, 2 symbols. The cardinality for source and destination of the association between symbol 301 and connector 302 is 1 to * for the source and 1 to * for destination.

Connector 302 has an annotation 304. Connector 302 may have many more annotations than are illustrated in this example. The inventor illustrates one annotation 304 and deems it sufficient for the purpose of explanation. The default cardinality between connector 302 and annotation 304 is 1 to *. It is noted herein the similarity of model structure of this example with the meta meta model structure of the example of FIG. 2 above. A meta-object is typically shown as a symbol in the diagram, with associated meta-properties shown as fields in the symbol. A meta-association is typically shown as a connector, with either static annotations or annotations derived from associated meta-object properties. A composite symbol (termed a container) can contain other symbols.

In order to take advantage of the unique mapping technique of the present invention, a programmable diagrammatic interface is required to have a language for specifying diagram elements. Diagrams are specified in terms of diagram types. Diagram types include Class diagrams, UseCase diagrams, etc. In a preferred embodiment of the present invention unique specification files are provided that define the diagrams while mapping languages are defined separately. A diagram type is specified by information contained in two separate and accessible specification files. These are a diagram specification file and a map specification file. A diagram specification file, according to a preferred embodiment, is provided to specify visual attributes of various symbols and icons that comprise a diagram type. A model map specification file is provided to map visual elements such as symbol, connector and annotation described in the diagram specification file with model elements such as meta object, meta property and meta association.

Diagram Specification Language

A diagram specification file as described above defines symbols, connectors, connector ends and annotations that make up a diagram type. Symbols and connectors are collectively referred to as icons. Each icon is uniquely identified by an identification value termed and expressed in syntax as IconId. In a specification file of a preferred embodiment, language for defining a symbol of a drawing is expressed below using the following syntax:

Symbol Definition

```
SYMBOL Name, IconId, FrameX, FrameY {
    Property Section
    Shape Section
    Boundary Section
}
```

It is noted that the symbol specification above contains 3 sections, a property section, a shape section, and a boundary section. In the property section, a user may specify certain properties like an icon bitmap for display in an icon palette of a generic but unique drawing tool (described further below). The property section also contains specifications for background color and similar attributes.

In the shape section of the specification above, a user may specify certain drawing commands used to draw the shape of a symbol used in a diagram. In the following syntax, various drawing commands are represented. It is noted for each command, that "options" expressed at the end of each line represent various attributes such as line style, color, width, fill pattern, and so on.

Drawing Commands
LINE StartX, StartY, EndX, EndY [: Options];
RECTANGLE TopLeftX, TopLeftY, Width, Height [: Options];
RRECTANGLE TopLeftX, TopLeftY, Width, Height, RWidth, RHeight [: Options]; —rounded rectangle
ELLIPSE TopLeftX, TopLeftY, Width, Height [: Options];
ARC TopLeftX, TopLeftY, Width, Height, StartAngle, EndAngle [: Options];
CHORD TopLeftX, TopLeftY, Width, Height, StartAngle, EndAngle [: Options];
PIE TopLeftX, TopLeftY, Width, Height, StartAngle, EndAngle [: Options];
POLYGON x1, y1, x2, y2, x3, y3 [, xn, yn] [: Options];
BITMAP "BmpName", TopLeftX, TopLeftY, Width, Height [: Options]
TEXT TextId, TopLeftX, TopLeftY, Width, Height, InitText, MaxChar [:Options]

It is noted herein that TEXT fields are provided for displaying properties of certain objects for user view. LIST fields such as LIST ListId, TopLeftX, TopLeftY, Width, Height [: Options], are provided for displaying multi-column lists.

In the boundary section of the above-described symbol specification, the boundary of a symbol is specified. Such a specification consists of a polygon having specified vertices. The polygon is adapted to enclose the shape of a particular symbol. Connector heads and tails are drawn to the edges of a polygon specifying the boundary of a symbol.

In the specification file, there is language provided for defining annotations and connector objects.

Annotation Definition

The annotation definition specifies an annotation, which is part of a connector specification. The following syntax illustrates a preferred specification for an annotation.

```
ANNOTATION Name, IconId, FrameX, FrameY {
    Property Section
    Shape Section
}
```

It is noted herein that like the symbol specification detailed further above, the annotation section has a property section and a shape section. These sections are provided to contain specifications such as background color (property section) and drawing commands (shape section) as was described previously with reference to the symbol specification.

A connector end is described as a connector head or a connector tail and is used to connect 2 symbols together. The specification for a connector end is described below.

Connector End Definition

The connector end definition syntax is identical, in a preferred embodiment, for both a connector head and a connector tail. The specification is part of a connector definition in the specification file described above. Both the connector head and tail are drawn inside a rectangle having specified dimensions.
CONNECTOREND Name, IconId, FrameX, FrameY,
  AttachX, AttachY { Drawing commands
}

It is noted herein that the drawing commands section contain the same types of drawing commands referenced above with respect to the symbol and annotation specifications.

Connector Definition

The syntax for specifying a connector definition, which includes a connector end definition is presented below:

```
CONNECTOR Name, IconId {
    Property Section
}
```

In the property section of the above specification, a user may specify properties like an icon bitmap to be displayed in an icon palette associated with a drawing tool as well as the connector ends to be used at the head, tail, or middle of a connector. Options include line style, color, width, and if the line style is double line then fill color, fill pattern, and so on.

Model Map Specification Language

The specification language of the present invention as taught above provides a complete semantic for defining the various symbols, connectors and other attributes of a visual diagram for creating and editing abstract models.

It will be appreciated that a mapping language is required in order to map diagram elements of a particular diagram type to meta model elements. The latter of the two provided specification files described further above is the map specification file. In a map specification, IconId refers to the IconId specified in the diagram definition file. The specification has a provision to specify external scripts (like extern 'C') using a 'script' directive. This is an escape route to enable more complex behavior where required. Symbol Specification A template for mapping a symbol icon to an object in a particular model is expressed in a preferred embodiment as follows:

```
symbol <symbol> {
    icon = <IconId>
    object = <repos meta object name>
    objectprop {
        <repos meta prop name> = <value> . . .
    }
    symbolprop {
        <fieldId> = prop(<repos meta prop name>) |
            assoc(<repos object name>,<repos meta assoc
        name>) |
            script ("OSC file name") . . .
    [listControl "<fieldId>"
    {
        [assocExpr = <repos meta assoc name>.<repos meta object
    name>.[<repos meta
    assoc name>.<repos meta object name>. . . ]
        colSpecs =
        {
            "<column header>" = <repos meta prop name> |
            <repos meta assoc name>.<repos meta object name>.[<repos
            meta assoc name>.<repos meta object name> . . . ].<repos meta
            prop name> |
                script ("script file name")
                . . .
        }
    }]
    }
}
```

It is noted herein that the symbol section in the above template associates a drawing sheet symbol with a meta-object contained in an object repository.

The object properties (objectprop) section is provided to enable a user to set certain attributes automatically in an object repository when an object of a particular type is created in an open drawing sheet. For example, by virtue of an object being of a particular type, certain attributes have to be set. These attributes should be obvious to a user just by the looking at the visual symbol of the object. Additionally, when a user opens an existing object, the object property specification serves as a filter screening only those objects from the repository, which match the values specified in the object properties section.

The symbol property (symbolprop) section of the template illustrated above specifies which properties of an associated object or objects from an object repository are to be displayed for a user along with an associated icon or icons in the open diagram. A list-control may be specified to display object property information as a list box having multiple columns.

Also in the map specification file, is a template for mapping an object container with objects (containees) therein.

Container Specification

The template for mapping a container with containees is expressed in a preferred embodiment in syntax as follows:

```
containerSpec <symbol> {
    container {
        symbol = <symbol> [<symbol> . . . ]
    }
    containee {
        symbol = <symbol> [<symbol> . . . ]
        association = <repos meta assoc name>
    }
    [containee {
        symbol = <symbol> [<symbol> . . . ]
        association = <repos meta assoc name>
    } . . .
    ]
}
```

The above template specifies which symbol contains which other symbols. The template also specifies the meta association between the meta-object mapped to the container symbol and the meta-object mapped to the container symbol.

Association Connector Specification

A template for mapping a connector (defined above) with a repository association is expressed in a preferred embodiment in the following syntax:

```
association connector <connector> {
    connectorIcon = <Connector IconId>
    sourceSymbol = <symbol> [<symbol> . . . ]
    destinationSymbol = <symbol> [<symbol> . . . ]
    association = <repos meta assoc name>
    [
        head = <ConnectorEnd IconId>
        tail = <ConnectorEnd Iconid>
    ]
    [connectorLabel = "<value>" |
        script ("script file name")
    ]
    [connectorLabel {
        "<Annotation IconId>" = "<value>" |
        "<Annotation IconId>" = script("script file name")
        . . .
    }]
}
```

In the above template, the sourceSymbol and destinationSymbol have to be symbols that are already defined in a current map file. The connector head and tail are optional. The ConnectorLabel is also optional and if existing appears alongside the connector in the diagram.

In the map specification file there is also a template for mapping a connector symbol specified in a diagram file to an object connector specified in an object repository.

Object Connector Specification

```
object connector <connector>
{
    connectorIcon = <Connector IconId>
    sourceSymbol = <symbol> [<symbol> . . . ]
    destinationSymbol = <symbol> [<symbol> . . . ]
    object = <repos meta object name>
    objectprop
    {
```

-continued

```
        <repos meta prop name> = <value> . . .
    }
    sourceAssociation = <repos meta assoc name>
    destAssociation = <repos meta assoc name>
    head
    {
        <repos meta prop value expression> => <ConnectorEnd IconId> . . .
            [ConnectorEnd IconId]
    }
    tail
    {
        <repos meta prop value expression> => <ConnectorEnd IconId> . . .
            [ConnectorEnd IconId]
    }
    [connectorLabel = "<value>" | <repos meta prop name> | script
("script file name")]
    [connectorLabel {
        "<Annotation IconId>" = "<value>" |
        "<Annotation IconId>" = <repos meta prop name> |
        "<Annotation IconId>" = script ("script file name")
        . . .
    }]
}
```

In the template above, the first 3 specifications are the same as those specifications in the previous template (association connector).

The object specification in the template is provided to map a connector to a repository object specified for the particular connector.

The objectprop section of the template carries the same meaning as the objectprop section in the first-illustrated symbol specification further above.

The sourceAssociation and destAssociation sections of the template capture the names of meta associations between a connector object and source/destination. Because a connector is defined as an object in an object repository, a connector may have different meta-associations with the source as compared to destination. The head and tail sections of the template above are provided for selecting head and or tail connector-ends. Filtering (selection) is based on a logical expression involving property values. For example, when an expression evaluates to TRUE, the corresponding connector-end is used. It is possible to specify a default connector-end when no expression is satisfied. The connectorLabel section of the template is optional as was described with reference to the same in the template of association connector specification illustrated further above. One difference is that a label in this template could also be a property of an associated connector object.

Yet another template is provided, in a preferred embodiment, for specifying a one to many junctions for defining junction boxes in a visual diagram.

One To Many Junction Specification

The template for defining a junction connector is, in a preferred embodiment, expresses in syntax as follows:

```
oneToManyJunction <symbol>
{
    icon = <IconId>
    [connectorIcon = <Connector IconId>]
    parent
    {
        symbol = <symbol>[<symbol> . . . ]
        [connectorIcon = <Connector IconId>]
        head
```

-continued

```
{
    <repos meta prop value expression>=>
<ConnectorEnd IconId>...
                    [ConnectorEnd IconId]
        }
    }
    child {
        symbol = <symbol>[<symbol> ... ]
        association = <repos meta assoc. name>|
        objectConnector {
            object = <repos meta object name>
            objectprop {
                <repos meta prop name> = <value> ...
            }
            parentAssociation = <repos meta assoc name>
            childAssociation = <repos meta assoc name>
        }
        [connectorIcon = <Connector IconId>]
        tail {
            <repos meta prop value expression>=> <
ConnectorEnd IconId> ...
                    [ConnectorEnd IconId]
        }
    } ...
}
```

The icon specification portion of the above template specifies a diagram symbol to represent a junction box in a diagram. The connectoricon specification is optional and is taken as a default for the various connectors required to connect a plurality of symbols to a single junction box. In this exemplary template, when one object (referred to as the parent) is connected to various objects (referred to as children), a junction box can be used such that, there is one connector between the junction box and the parent and different connectors between the junction box and each of the children. The parent specification identifies the parent symbol, which is previously defined in the map specification file, and the diagram connector to be used to connect the parent symbol to the junction box. Inserting a specific value will overwrite a default value if there is one specified. This is an optional specification and if not specified, the default specification given in the beginning will be taken.

The head specification is used as a filter to select a connector-end for a connector from a junction-box to a parent symbol. As previously described above, filtering is based on a logical expression involving property values. For example, when the expression evaluates to TRUE, the corresponding connector-end is used. It is possible to specify a default connector-end when no expression is satisfied.

The child specification in the above template identifies a child symbol and a connector to be used to connect the child to the junction box. There can be more than one child specification. The child symbol is previously defined in the map specification file. In one embodiment, the child specification also specifies whether a connection between a child and a parent in an object repository is a meta association or if there exists another object in the repository through which the parent and child connect to each other. In either case, the relevant information has to be entered into the template as in the case of object connector.

The connectorIcon specification in the described template specifies a diagram connector to be used for a connector between a child symbol and a junction box. Inserting a value here will overwrite a default value if there is one specified. This is an optional specification and if not specified, the default specification given in the beginning will be taken.

The tail specification is used as a filter to select a connector-end for a connector from a junction box to a child. The filtering as previously described is based on a logical expression involving property values. For example, when the expression evaluates to TRUE, the corresponding connector-end is used. It is possible to specify a default connector-end when no expression is satisfied.

Nary Connector Specification

A Nary connector can be used to represent associations in case where a particular meta object is linked with a number of other meta objects through independent associations. A Nary connector can have many parents and many children. All parents are connected to all children with associations, which are independent of each other.

A template for defining a Nary connector is, in a preferred embodiment, expressed in syntax as follows:

```
naryConnector <connectorName> {
    icon = "<Connector IconId>"
    parent {
        symbol = <symbol> [<symbol> ... ]
        [head = "<ConnectorEnd IconId>"]
        [head { "<ConnectorEnd IconId>" }]
    }
    child
    {
        symbol = <symbol> [<symbol> ... ]
        association = <repos meta assoc name> |
        objectConnector {
            object = <repos meta object name>
            [objectprop {
                <repos meta prop name> = "<value>" ...
                parentAssociation <repos meta assoc name>
                childAssociation = <repos meta assoc name>
        }
        [tail = "<ConnectorEnd IconId>"]
        [tail {
            <repos meta prop value expression> =>
"<ConnectorEnd IconId>" ... |
            "<ConnectorEnd IconId>"
        }
        ]
    }
```

A Generic Diagram Drawing Tool

A unique drawing tool must be provided that is generic in terms of interoperation capability with various modeling techniques and can interpret the specification language used for providing the diagrammatic interface of the invention.

In a preferred embodiment, the drawing tool supports a drawing sheet window and an icon palette for dragging and dropping icons. The icons represent symbols and connectors defined in the specifications above. Standard drawing tools of prior art are limited to the capability of drawing pictures only. However, the drawing tool of the present invention is adapted specifically to enable representation of modeling entities (stored in a repository) according to the unique specification semantics described further above. The drawing tool can only draw abstractions that are semantically correct.

When a user selects an icon from the icon palette and places the icon on the drawing sheet, the tool draws a symbol or connector as defined in the diagram specification file for the type diagram the user is creating. The tool also recognizes the mapping between the selected icon and a model element, which is an instance of a meta-object as specified in an associated map specification file described above. It is possible, in a preferred embodiment, to select an existing model element or to create a new model element with the drawing tool.

Model element selection through the drawing tool adheres to any filtering constraints that may be specified in the map specification file of the type diagram the user is working in. If an icon selected is a symbol, then the symbol's fields (text as well as list fields) are populated according to rules specified in the map specification file.

When a connector icon representing an association connector is selected from an icon palette of the drawing tool and placed between two symbols, the following events occur. Firstly, if the connector is not a valid connector that is usable between the symbols, an error message is displayed for the user. Secondly, if a specified association already exists in the associated object repository, then the connector icon will automatically appear, that is to say no action needs to be performed by the user in order to connect the 2 symbols on the drawing sheet. If the association connector is created, it should also be established within the repository.

When a connector icon representing an object connector is selected by a user from an icon palette and then placed between two symbols, the following events occur. Firstly, if the connector is not valid between the symbols, an error message stating so is displayed for the user as described above. Also as described above, if there already exists an object in the repository with associations as specified in the map specification file between the two symbol objects represented by the symbol icons, then no action needs to be performed by the user. The connector automatically appears. Any newly created object and it's required associations need to be established within the repository if they are to be used in a drawing.

When a connector icon representing a junction connector is selected by a user and then placed between a junction box and a parent symbol on the drawing sheet, the following events occur. Firstly, if the junction box has no connected child symbols, then nothing needs to be done. If the junction box has connected child symbols, then associations need to be created between the objects represented by the parent symbol and each of the child symbols if these associations do not already exist in the repository.

When a connector icon representing a junction connector is selected from the palette by a user and then placed between a junction box and a child symbol on the drawing sheet, the following events occur. If the junction box has no connected parent symbol, then nothing needs to be done. If the junction box has a connected parent symbol, then an association needs to be created between the object represented by the parent symbol and the object represented by the child symbol if the association does not already exist in the repository.

When a connector icon representing an nary connector is selected from the palette by a user and then placed between a parent symbol and a child symbol on a drawing sheet, a specified association or an object with appropriate associations is created between the objects representing the parent and the child. When a nary connector is selected from the palette and placed between a parent symbol and a nary edge on a drawing sheet, specified associations or objects with appropriate associations are created between the object representing the parent and the objects represented by each of the child symbols.

It is noted herein that for all connector types discussed herein, annotations are displayed as specified in the map specification file and all of the connector ends are manipulated as specified.

When a containee symbol is selected from the palette by a user and then placed on the drawing sheet inside a container symbol, an association as specified in the map specification file, is created between objects representing the container and the containee symbol or symbols.

In addition to interpretation of diagram and map specification files, the diagrammatic tool provides common behavior such as grouping symbols, copy and paste, move, alignment, and similar functions found in most drawing tools.

It will be apparent to one with skill in the art that a diagrammatic visual interface such as the one taught above implemented as part of a repository system will greatly enhance the productivity of repository implementation teams, for example, by enabling them to quickly implement diagrammatic notations for ever-evolving modeling abstractions. The system enables end users to quickly implement visual modeling notations of their choice for realizing enhanced meta-models, thus allowing them to fully utilize and exploit any built-in extensibility features of any extensible model repository systems. The diagram model of the example of FIG. 3 reflects the structure of the meta meta model represented in FIG. 2, therefore providing a close match between modeling abstractions and diagrammatic notations.

In a preferred embodiment, the system of the invention is implemented by model-repository system builders that build the generic and programmable diagramming tool as per the diagramming model described with reference to FIG. 3 above. The tool must, of course, operate accordingly with the above-described diagram and map specification languages. System builders also specify diagram notations for pre-defined modeling abstractions, the specifications accessible from the above-described diagram and map specification files.

End users operating the novel interface of the invention can design diagram notations for any "new" modeling abstractions added by them and express them in diagram specification language using the drawing tool without being required to write complex code. Similarly, mapping specifications between the model entities and diagram notations are created and expressed in the map specification file.

The system of the invention greatly enhances productivity of repository implementation teams by enabling them to quickly implement diagrammatic notations for ever-evolving modeling abstractions. Moreover, end users can quickly implement visual modeling notations of their choice for enhanced meta-models, thus allowing them to fully utilize and exploit the built-in extensibility features of model repository systems. In addition, the diagram model reflects the structure of a meta meta model providing a close match between modeling abstractions and diagramming notations.

The method and apparatus of the invention can be used with virtually any type of object oriented software system, and therefore, should be afforded the broadest scope under examination. The spirit and scope of the invention should be limited only by the claims that follow.

What is claimed is:

1. A software control interface for creating and editing system views of a business information system using object models shaped to define the system views comprising:
    a drawing tool for visually representing system views using model elements represented by icons;
    a first specification language for defining the various elements of a drawing; and
    a second specification language for defining mapping between drawing icons and objects stored in an object repository of the software system;

characterized in that a user operating the drawing tool through a graphical user interface can, by dragging and dropping icons of the drawing tool onto a drawing sheet of the drawing tool, specify abstract models and model extensions expressed in diagrammatic notation transparent to the user and usable by the software system and associated repository.

2. The software control interface of claim 1 wherein the modeling system is defined according to a meta modeling framework that adheres to a hierarchical tri-level structure of abstraction.

3. The software control interface of claim 2 wherein the modeling framework includes a system information model, a meta model and a meta meta model.

4. The software control interface of claim 3 wherein the language for describing the system information model is UML.

5. The software control interface of claim 3 wherein the language for describing the system information model is XML.

6. A method for creating and manipulating business system views of a complex software system through user manipulation of visual symbols and connectors stored in an object repository associated with the system, the symbols and connectors represented in an interface of a drawing tool comprising steps of:
   (a) providing a first specification language specifying the symbols and connectors of the drawing tool;
   (b) providing a mapping second specification language for mapping drawing elements to repository objects;
   (c) selecting certain symbols and connectors from a palette of the drawing tool, and dropping them in certain order on an open sheet of the drawing tool until a view or view edit is complete; and
   (d) when complete, executing a completed system view for display on a graphical interface of the software system.

7. The method of claim 6 wherein in steps (a) through (d) a hierarchical tri-level meta modeling framework is observed.

8. The method of claim 7 wherein the meta modeling framework includes a system information model at a first level of abstraction, a meta model at a higher level of abstraction and a meta meta model at a highest level of abstraction.

9. An object modeling system for creating, editing, and displaying various views of a business information system comprising:
   an object repository for storing object models and model elements;
   a drawing tool for visually representing system views using model elements represented by drawing icons associated with the tool;
   a first specification language for defining the various elements of a drawing represented by the drawing icons; and,
   a second specification language for defining mapping between the drawing icons and model elements stored in the object repository;
   characterized in that the system operates according to a tri-level meta modeling framework including a meta meta model functioning as a base model for the instantiation hierarchy of the framework, a meta model formed as an instance of the meta meta model, the meta model defining the structure and semantics for an information system view, and an information system model formed as an instance of the meta model, the information system model describing one or more specific information system views as specified by the meta model.

10. The object modeling system of claim 9 wherein UML, XML, and entity relationship modeling language is supported at the highest level of abstraction.

11. The object modeling system of claim 9 wherein the icons comprise symbols and connectors.

12. The object modeling system of claim 9 wherein the association between the drawing icons and model elements stored in the repository is automated.

13. The object modeling system of claim 9 wherein dragging and dropping drawing icons from a drawing palette into a drawing sheet causes machine readable instruction for building system views in an object oriented way, the instruction code transparent to the user.

14. The object modeling system of claim 13 wherein the views are customizable and extendable over existing system views by creating new icons and connectors using the drawing tool, specifying them in the drawing and mapping languages and storing the elements in the object repository.

* * * * *